Figure 1:
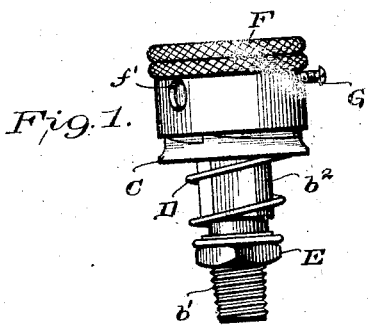

C. E. KELLS, Jr.
LUBRICATOR.
APPLICATION FILED AUG. 28, 1911.

1,037,923.

Patented Sept. 10, 1912.

Witnesses
J. Adolph Bishop
M. E. Burrell

Inventor
C. E. Kells, Jr
By Baldwin Wight
Attorneys

UNITED STATES PATENT OFFICE.

CHARLES EDMUND KELLS, JR., OF NEW ORLEANS, LOUISIANA.

LUBRICATOR.

1,037,923.

Specification of Letters Patent. Patented Sept. 10, 1912.

Application filed August 28, 1911. Serial No. 646,403.

*To all whom it may concern:*

Be it known that I, CHARLES EDMUND KELLS, Jr., a citizen of the United States, residing in New Orleans, in the parish of Orleans and State of Louisiana, have invented certain new and useful Improvements in Lubricators, of which the following is a specification.

My invention relates to lubricators of the class known as grease cups which are extensively used for lubricating various kinds of machinery, especially certain parts of automobiles.

The object of my invention is to provide a lubricator of this class which is simple in construction, easily filled and adjusted, and conveniently taken apart when necessary.

In carrying out my invention, I provide a cylindrical grease-receiving cup open at one end and threaded interiorly to engage a threaded plunger, which extends into the cup. The plunger is formed with a hollow stem which is threaded at its outer end to engage that part of the machinery to be lubricated. The edge of the cup is formed with ratchet teeth which engage corresponding teeth on a ratchet disk which is free to move endwise on the stem of the plunger but is held against rotary movement thereon. The stem of the plunger carries a collar near its outer end and between this collar and the ratchet disk is interposed a spring which serves to press the disk against the outer toothed end of the cup. Surrounding the cup is a cup-shaped casing which is formed at its end with an opening adapted to register with a similar opening in the end of the cup, and said casing is also formed with an opening in its side adapted to register with a similar opening in the side of the cup; the arrangement, however, being such that when the openings in the end of the cup and casing register the openings in the sides of these parts will be closed. The casing is also formed in its side with a slot through which extends a pin or screw which serves as a stop to limit the movement of the casing relatively to the cup.

When the parts are assembled, the casing may be turned, so as to cause the openings in the ends of the cup and casing or the openings in the sides thereof to register and then grease may be injected by an ordinary grease gun. Then the casing may be turned to close the openings and then by turning the casing and cup together the plunger may be made to enter the cup and expel or feed grease to the desired extent. The ratchet disk prevents backward movement of the cup and this disk is held in operative relation with the cup by the spring referred to. When it is desired to increase the grease space in the cup for the purpose of filling it, the ratchet disk may be separated from the cup against the force of the spring and held away from it during the refilling process.

Figure 2:
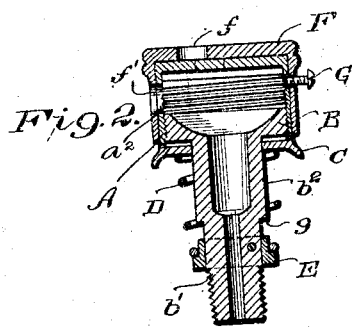
Figure 3:
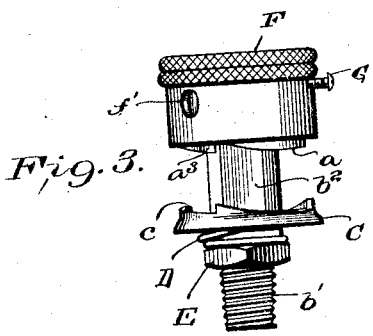
Figure 4:
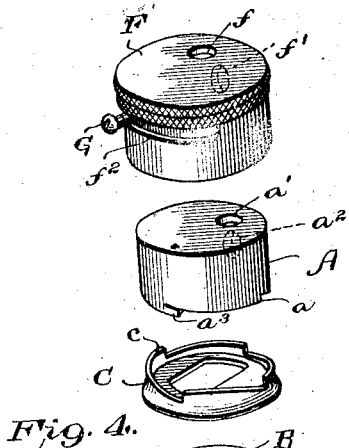
Figure 5:
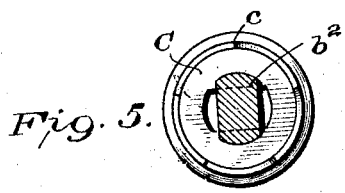

In the accompanying drawings:—Figure 1 shows a side elevation of a grease cup embodying my improvements. Fig. 2 shows a vertical central section thereof. Fig. 3 is a view similar to Fig. 1, but showing the ratchet disk separated from the grease cup. Fig. 4 is a perspective view of all the parts separated. Fig. 5 shows a transverse section of the device.

The grease cup A is cylindrical, being closed for the most part on its side and at one end while the other end is open. The sides are provided with an interior screw thread and its outer edge is formed with ratchet teeth $a$. An opening $a'$ is formed in the end of the cup and an opening $a^2$ in the side thereof. The plunger B is threaded at $b$ to engage the threads of the cup and it has a hollow stem $b'$ which is threaded at its lower end to engage the part of the machinery to be lubricated.

C indicates a ratchet disk having teeth $c$ adapted to engage the teeth $a$ of the cup, and this disk is normally pressed against the cup by a spring D interposed between the disk and a collar E rigidly attached to the stem $b'$.

F indicates a cylindrical casing surrounding the cup A and having a closed end provided with an opening $f$ adapted at times to register with the opening $a'$ in the end of the cup and with an opening $f'$ in its side adapted to register with the opening $a^2$ in the side of the cup. The arrangement is, however, such that when the openings $f$ and $f'$ register, the openings $f'$ and $a^2$ will not register. In order to obtain this result, the opening in the end of one of the members opening in the end of one of the members A or F is in a different vertical plane from the opening in the side of said member (see Fig. 2). The casing is adapted to turn to a limited extent relatively to the cup and in order to regulate and control this movement, the casing is formed with a slot $f^2$ through which extends a stop device such as a screw G rigidly connected with the cup.

The upper portion $b^2$ of the stem of the plunger is of oval or polygonal shape and it extends through a correspondingly shaped opening in the ratchet disk, the arrangement being such that while the disk can move endwise on the stem it cannot turn thereon when it engages the cup. The part $b^2$ of the stem terminates above the collar E in a shoulder $g$ and below the shoulder the stem is cylindrical, so that when desired the disk may be moved away from the edge of the cup to the position shown in Fig. 3 and then turned slightly so that it will be held in this position by the shoulder. This is the position that the disk occupies when the grease chamber is being increased in size in order to be refilled. When the disk engages the cup this backward movement of the cup, relatively to the plunger to increase the grease space, cannot be effected.

Fig. 4 shows the parts of the device separated. To assemble them the disk C and spring D are slid over the stem $b'$ and then the collar E is applied and secured. The plunger is then made to engage the cup and the casing F is applied to the cup and the screw G attached.

In Fig. 2 the parts are shown assembled. The openings $f$ and $a'$ are out of register while the openings $f'$ and $a^2$ register, and when in this condition grease may be injected into the grease chamber or inserted by any usual device. Sometimes it may not be convenient to inject grease through the openings $a^2$ and $f'$. This is especially the case when the device is applied to automobiles. But by properly turning the casing F, the openings at $a^2$ and $f'$ may be closed, while the openings $a'$ and $f$ may be made to register and the grease gun may be applied at this point. This is really quite an important feature in a grease cup for automobiles.

When the casing is turned in the proper direction to force the grease into the bearing, both openings are closed so that neither opening can be accidentally left open. Again when the cup is empty and the casing is turned in an opposite direction the ports are automatically opened. The spring D holds the ratchet disk against the edge of the cup so that the latter may be turned in the proper direction to expel the grease through the hollow stem; this disk is held positively by its connection with the stem so that it cannot turn thereon and the ratchet devices are so formed on both the cup and on the disk that a backward movement of the plunger cannot be effected as long as the disk is in engagement with the cup, but the ratchet disk may be easily separated when desired and held away from the cup in the manner shown in Fig. 3 so that the casing may be turned in either direction to either increase or decrease the size of the grease chamber. If desired, the outward movement of the plunger from the cup may be stopped or arrested by bending inward slightly one of the ratchet teeth on the cup as indicated at $a^3$ in Fig. 4. It will be observed that the organization is such that when it is desired to refill the cup, the casing F is first turned relatively to the cup A until the ports $f'$ and $a^2$ register. Then the screw G abuts against one of the end walls of the slot $f^2$ and thereafter the grease cup is turned around the threaded end of the plunger B and effects the enlargement of the grease space in the cup. In this way air is admitted during the enlargement of the space and any suction through the plunger is avoided. After the space is sufficiently enlarged grease may be injected through the ports and then the casing may be turned on the cup to close the ports.

I claim as my invention:—

1. A lubricator, comprising a plunger constituting the stationary member of the lubricator, a cylindrical grease cup having an opening in its end and an opening in its side constituting one of the movable members of the lubricator, a cylindrical casing constituting the other movable member surrounding the grease cup and having an opening in its end adapted to register with the opening in the end of the cup and an opening in its side adapted to register with the opening in the side of the cup when the opening in the end of the cup is closed by the casing, the opening at the end of one of the movable members being in a different vertical plane from the opening in the side of said member.

2. A lubricator, comprising a cylindrical grease cup having an opening through one of its walls, a cylindrical casing surrounding the grease cup and having an opening through it adapted to register with the opening in the cup, a threaded plunger engaging the interior of the grease cup and adapted to move endwise therein when the grease cup is turned thereon, and devices connecting the casing and the cup permitting the former to turn to a limited extent on the cup to cause its opening to register with the opening in the cup and to then turn the cup on the threaded plunger to enlarge the grease space in the cup.

In testimony whereof, I have hereunto subscribed my name.

CHARLES EDMUND KELLS, Jr.

Witnesses:
 CHAS. J. RIVET,
 SAMUEL H. MCAFEE.